United States Patent [19]

Sparrow et al.

[11] Patent Number: 4,986,959
[45] Date of Patent: Jan. 22, 1991

[54] NUCLEAR FUEL ASSEMBLY WITH EXPANDABLE TOP NOZZLE SUBASSEMBLY

[75] Inventors: James A. Sparrow; Yu C. Lee, both of Columbia, S.C.

[73] Assignee: Westinghouse Electric Corp., Pittsburgh, Pa.

[21] Appl. No.: 353,303

[22] Filed: May 17, 1989

[51] Int. Cl.$^5$ .............................................. G21C 3/32
[52] U.S. Cl. .................................. 376/445; 376/446
[58] Field of Search ............................... 376/445, 446

[56] References Cited

U.S. PATENT DOCUMENTS

| Re. 31,583 | 5/1984 | Klomb et al. | 376/364 |
|---|---|---|---|
| 3,169,097 | 2/1965 | Meyers | 176/79 |
| 4,072,564 | 2/1978 | Jabsen | 176/76 |
| 4,075,058 | 2/1978 | Noyes | 176/21 |
| 4,078,967 | 3/1978 | Anthony | 176/78 |
| 4,269,661 | 5/1981 | Kmonk et al. | 176/50 |
| 4,278,501 | 7/1981 | Steinke | 176/78 |
| 4,534,933 | 8/1985 | Gjertsen et al. | 376/364 |
| 4,572,816 | 2/1986 | Gjertsen et al. | 376/261 |
| 4,603,027 | 7/1986 | Wilson et al. | 376/446 |
| 4,628,581 | 12/1986 | Gjertsen et al. | 29/428 |
| 4,670,213 | 6/1987 | Wilson et al. | 376/446 |
| 4,692,304 | 9/1987 | Gjertsen | 376/446 |
| 4,707,326 | 11/1987 | Wilson et al. | 376/261 |
| 4,762,676 | 8/1988 | Gjertsen et al. | 376/443 |

FOREIGN PATENT DOCUMENTS

0084480 1/1983 European Pat. Off. .

Primary Examiner—Donald P. Walsh
Assistant Examiner—Meena Chelliah

[57] ABSTRACT

An expandable top nozzle subassembly for a nuclear fuel assembly includes an upper structure having a top plate and a depending peripheral sidewall enclosure, a lower adapter plate disposed below the top plate and within the enclosure with the adapter plate and sidewall enclosure being slidably movable relative to one another so as to move the top plate toward and away from adapter plate, and a plurality of resiliently-yieldable biasing devices extending between and engaging the top plate and lower adapter plate. Interengagable structure on a lower edge of the enclosure and on a peripheral edge of the adapter plate capture and retain the adapter plate within the enclosure upon movement of the enclosure relative to the adapter plate which moves the top plate away from the adapter plate. The biasing devices in the form of coil springs are movable between compressed and expanded states in response respectively to application and removal of a hold-down force on the upper structure in the direction of the adapter plate for permitting and causing movement of the enclosure relative to the adapter plate so as to move the top plate toward and away from the adapter plate and thereby the top nozzle subassembly between compressed and expanded conditions.

22 Claims, 7 Drawing Sheets

NUCLEAR FUEL ASSEMBLY WITH EXPANDABLE TOP NOZZLE SUBASSEMBLY

BACKGROUND OF THE INVENTION

1. Field of the Invention

The present invention relates generally to fuel assemblies for nuclear reactors and, more particularly, is concerned with an expandable top nozzle subassembly allowing improved utilization of space for accommodating greater growth and burnup of fuel rods of the fuel assembly.

2. Description of the Prior Art

In most nuclear reactors, the reactor core is comprised of a large number of elongated fuel assemblies which receive support and alignment from upper and lower transversely extending core support plates. The upper and lower core support plates are directly or indirectly attached to a support barrel which surrounds the entire core and extends between the ends thereof.

Conventional designs of these fuel assemblies include a plurality of fuel rods and control rod guide thimbles held in an organized array by a plurality of grids spaced along the fuel assembly length and attached to the control rod guide thimbles. The guide thimbles extend slightly above and below the ends of the fuel rods. Top and bottom nozzles on opposite ends of the fuel assembly are secured to the guide thimbles to thereby form an integral fuel assembly. The fuel assemblies are arranged vertically resting on the lower core support plate. To facilitate handling and installation, the fuel assemblies are generally not secured to the lower core support plate.

Temperatures at various times within the core may vary greatly, such as, from cold shutdown to normal operating conditions. Also, different materials exhibit different irradiation and thermal growth characteristics. Since the materials of fuel assembly components are generally different than those used in the core support barrel and undergo greater thermal expansion, the resulting increase in length of the fuel assemblies in the axial or vertical direction must be accommodated. For this reason, the fuel assemblies are not usually attached to the upper and lower core plates but rather are supported in a manner which permits some relative motion therebetween.

The axial thermal expansion differential between the fuel assemblies and the core support barrel has been accommodated by insuring that the axial spacing between the upper and lower core support plates is somewhat greater than the axial length of the fuel assemblies. Normally, this is accomplished by providing an axial gap between the top of the fuel assemblies and the upper core support plate. However, the presence of the gap can result in upward lifting of the fuel assemblies due to the hydraulic forces produced on the fuel assemblies in the upward direction by coolant flow. Thus, fuel assemblies have also employed hold-down devices with the top nozzles to prevent the force of upward coolant flow from lifting the fuel assemblies into damaging contact with the upper core support plate, while at the same time allowing for changes in fuel assembly length due to core-induced thermal expansion and the like. Representative to the prior art fuel assemblies with hold-down devices are those disclosed in U.S. Pat. No. Re. 31,583 to Klumb, U.S. Pat. No. 4,078,967 to Anthony, U.S. Pat. No. 4,534,933 to Gjertsen et al, U.S. Pat. Nos. 4,620,960 and 4,670,213 to Wilson et al.

As mentioned previously, the guide thimbles of fuel assemblies extend slightly above and below the ends of the fuel rods. Thus, the top and bottom nozzles of fuel assemblies secured at opposite ends of the guide thimbles likewise are spaced above and below the fuel rod ends. This space between the opposite ends of the fuel rods and adjacent portions of the top and bottom nozzles accommodates increase in length of the fuel rods due to growth as fuel rod burnup occurs during normal reactor operation.

With improvements in various aspects of fuel assembly design, it has become feasible to increase the allowable burnup of the fuel rods. This increase in burnup is desirable because it decreases the frequency of plant shutdowns and the buildup of spent fuel. However, to permit the fuel rods to operate to a higher burnup, an increase of approximately 0.5 inch minimum in fuel rod length is necessary due to extra growth. This necessitates an increase in the space between the adapter plates of the top and bottom nozzles to accommodate this additional fuel rod growth. At the same time, there still must be enough space between the top plate and adapter plate of the top nozzle to allow the handling equipment of the core to get between the plates and latch onto the underside of the top plate of the top nozzle.

Currently, there is not enough room between the adapter plates of the top and bottom nozzles to permit the additional 0.5 inch growth in fuel rod length. Consequently, a need exist for a way to accommodate extra fuel rod thermal growth without impairing the handling capability of the core equipment currently in use.

SUMMARY OF THE INVENTION

The present invention provides an expandable top nozzle subassembly designed to satisfy the aforementioned needs. The expandable top nozzle subassembly of the present invention enables a fuel assembly to accommodate fuel rod growth in excess of one inch, allowing a reactor to operate at a higher burnup rate. This length extension will allow the fuel rods to be pushed to burnups greatly in excess of those used today. Additionally, where extremely high burnups are not required, the mechanical duty of the fuel rods can be reduced significantly. The present invention makes use of "dead space" existing in the conventional top nozzle between its top plate and bottom adapter plate. This space is characterized as "dead" since it is only used during installation and removal of the fuel assembly and not during operation of the core. The expandable (and compressable) top nozzle subassembly of the present invention thus provides for the additional fuel rod growth space needed, while continuing to allow the use of current handling systems and thus eliminating potential costs to customers in design changes.

Accordingly, the present invention is directed to an expandable top nozzle subassembly for a nuclear fuel assembly which permits increased fuel rod growth and burnup. The top nozzle subassembly comprises: (a) an upper structure including a top plate and a sidewall enclosure rigidly connected to and depending from an outer peripheral edge of the top plate; (b) a lower adapter plate disposed below the top plate of the upper structure and within the enclosure thereof, the adapter plate and sidewall enclosure being slidably movable relative to one another so as to move the top plate toward and away from the lower adapter plate; (c)

interengaging means on a lower edge of the enclosure and on an outer peripheral edge of the adapter plate for capturing and retaining the adapter plate within the enclosure upon movement of the enclosure relative to the adapter plate which moves the top plate away from the adapter plate; and (d) a plurality of resiliently-yieldable biasing devices disposed in the enclosure and extending between and engaging the top plate and the adapter plate, the devices being movable between compressed and expanded states in response respectively to application and removal of a hold-down force on the upper structure in the direction of the adapter plate for respectively permitting and causing movement of the enclosure relative to the adapter plate so as to move the top plate toward and away from the adapter plate and thereby the top nozzle subassembly between compressed and expanded conditions.

More particularly, the top plate has a plurality of corner portions and at least one recess formed in a lower surface of the top plate at each corner portion. The adapter plate has a plurality of corner portions and at least one recess formed in an upper surface of the adapter plate at each corner portion. Each recess of the adapter plate is aligned below one of the recesses of the top plate. The biasing devices are a plurality of coil springs movable between expanded and compressed states. Each coil spring is disposed between the top plate and lower adapter plate and seated at its opposite upper and lower ends in respectively aligned pairs of the recesses of the top plate and adapter plate.

Further, the sidewall enclosure of the upper structure is composed of generally planar vertical wall portions rigidly interconnected together at their opposite vertical edges. The interengaging means on the lower edge of the sidewall enclosure is a retaining structure which projects inwardly from the sidewall enclosure and is composed of a series of spaced fingers. The interengaging means on the outer peripheral edge of the adapter plate is an undercut seat structure having a cross-sectional configuration which interfits in overlying relation with the cross-sectional configuration of the inwardly-projecting retaining structure of the sidewall enclosure so as to capture and prevent movement of the adapter plate past the lower edge of the enclosure.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like references characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Figure 1:
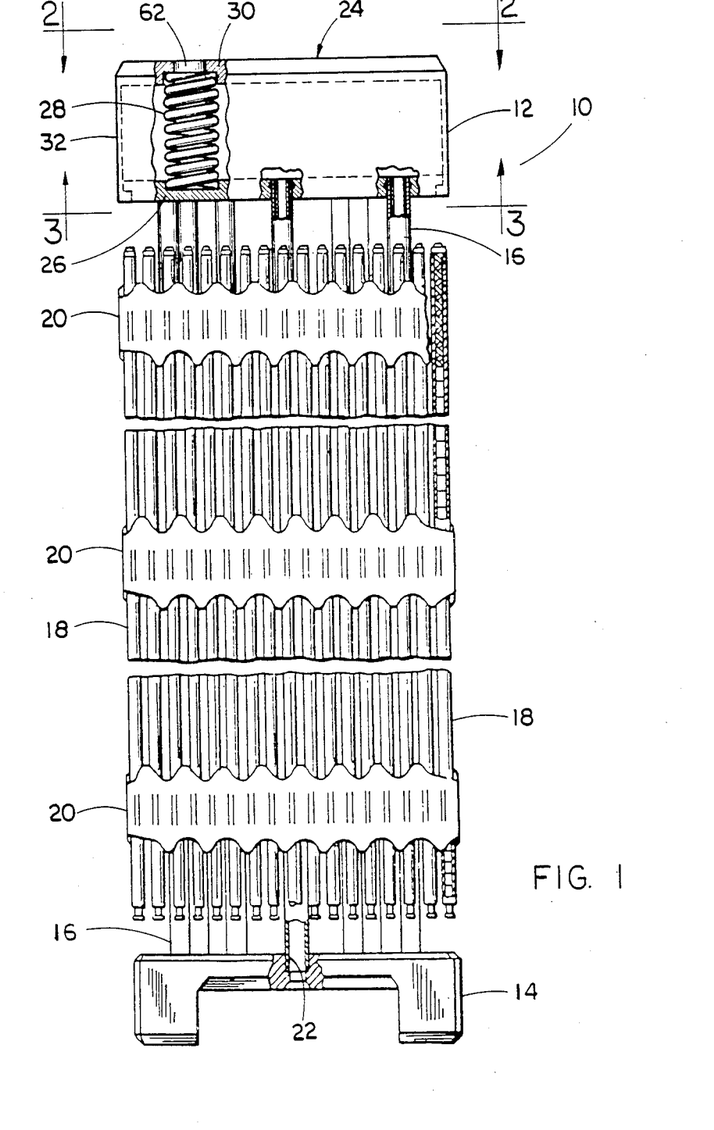
FIG. 1 is a partially sectioned elevational view, with parts being broken away for clarity, of a fuel assembly having an expandable top nozzle subassembly in accordance with the principles of the present invention.

Referring now to the drawings, and particularly to FIG. 1, there is shown a fuel assembly, generally designated by the numeral 10, having an expandable top nozzle subassembly 12 constructed in accordance with the principles of the present invention. In addition to the top nozzle subassembly 12, the fuel assembly 10 basically includes a bottom nozzle 14 for supporting the fuel assembly on the lower core support plate (not shown) in the core region of a nuclear reactor (not shown) and a number of longitudinally extending control rod guide tubes or thimbles 16 projecting upwardly from the bottom nozzle 14 and attached at their upper and lower ends to the top nozzle subassembly 12 and bottom nozzle 14. Further, an organized array of fuel rods 18 are held in spaced relationship to one another by a number of transverse grids 20 spaced along the fuel assembly length and attached to the guide thimbles 16. An instrumentation tube 22 is located at the center of the fuel assembly 10. The top nozzle subassembly 12, bottom nozzle 14 and guide thimbles 16 together form an integral assembly capable of being conventionally handled without damaging the assembly parts.

Figure 2:
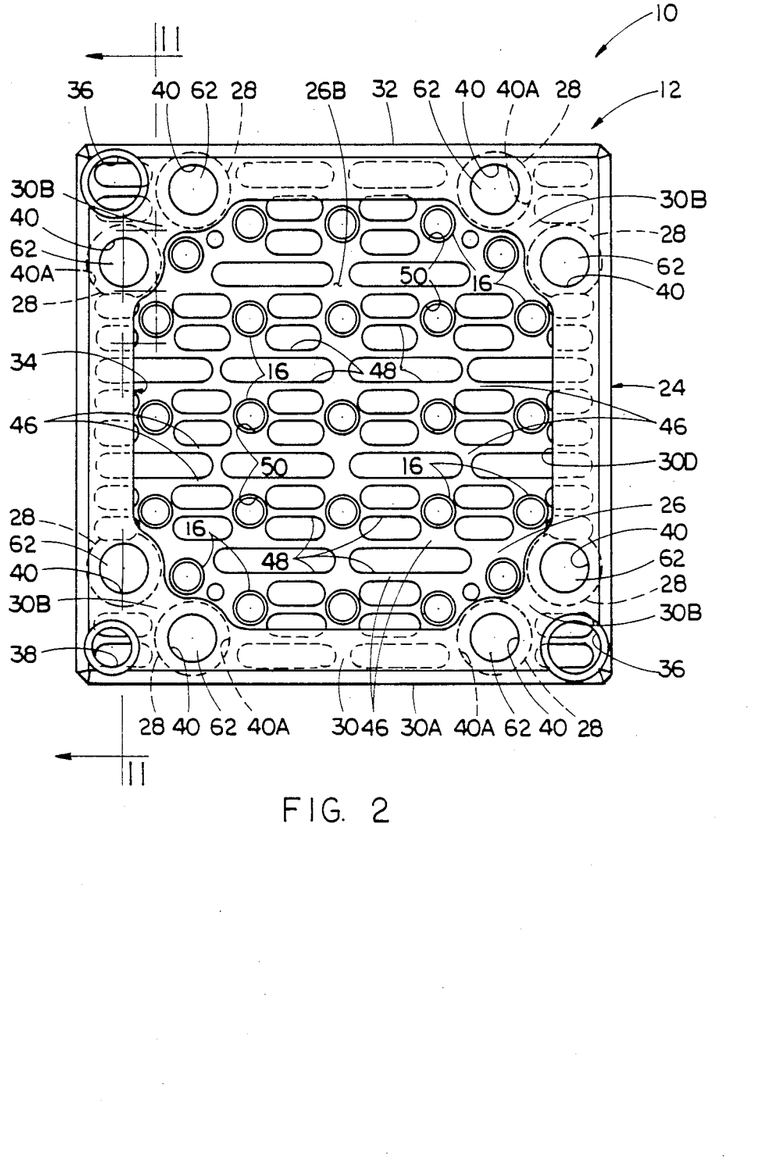
FIG. 2 is an enlarged top plan view of the fuel assembly as seen along line 2—2 of FIG. 1.
Figure 3:
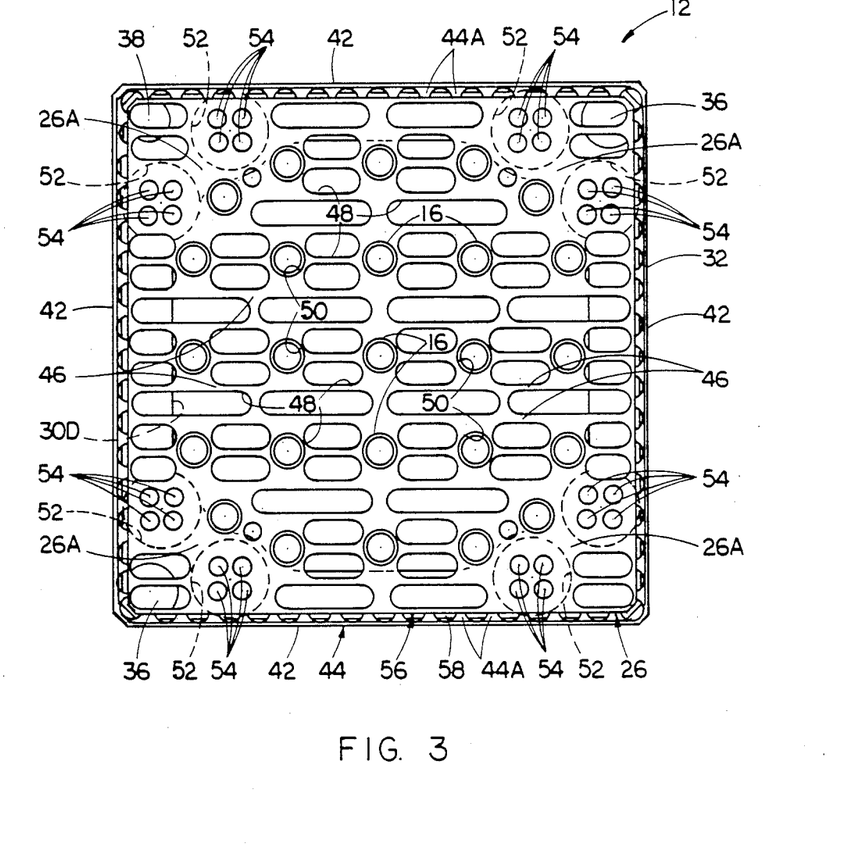
FIG. 3 is an enlarged sectional view of the fuel assembly as taken along line 3—3 of FIG. 1.
Figures 4, 5, 6:
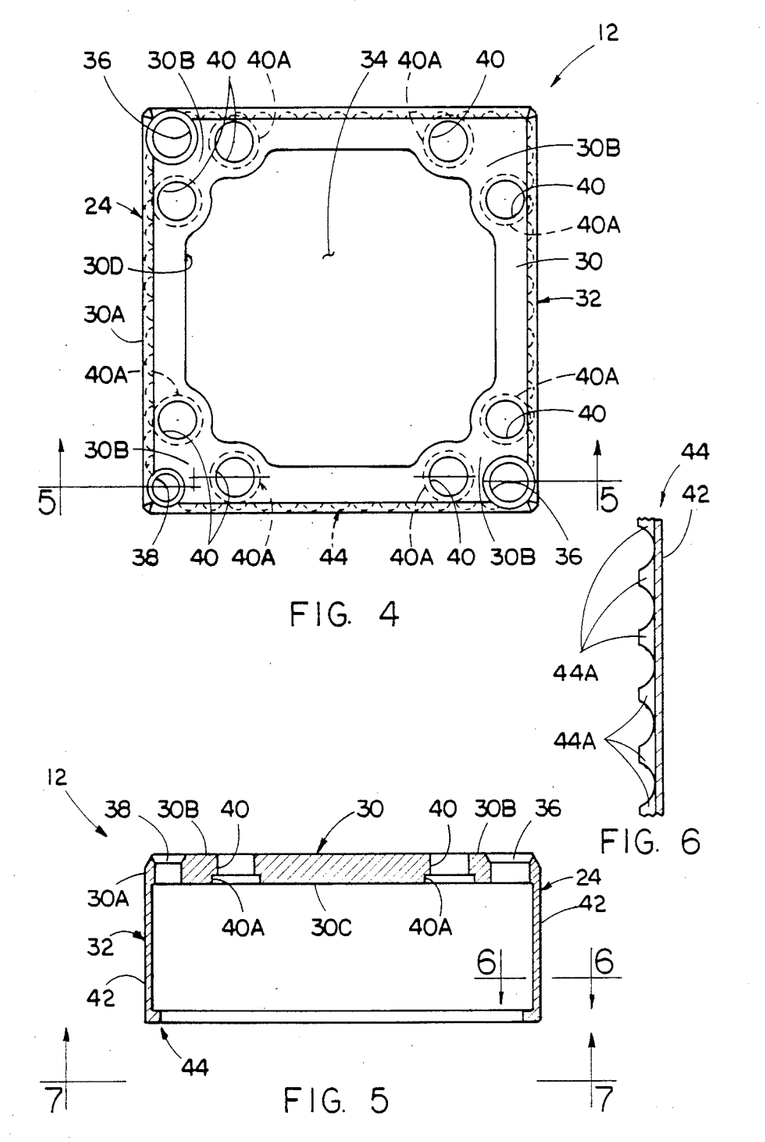
FIG. 4 is a top plan view of an upper structure of the expandable top nozzle subassembly of the present invention.
FIG. 5 is a sectional view of the upper structure as taken along line 5—5 of FIG. 4.
FIG. 6 is a sectional view of a sidewall enclosure of the upper structure as taken along line 6—6 of FIG. 5.
Figure 7:
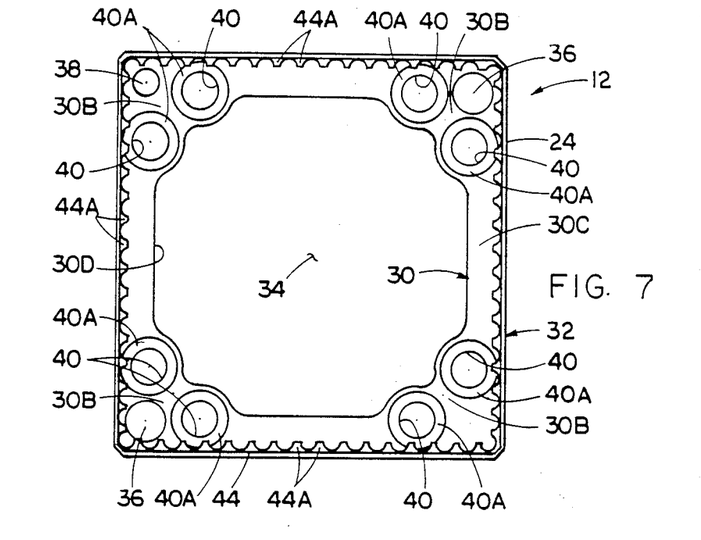
FIG. 7 is a bottom plan view of the upper enclosure as seen along line 7—7 of FIG. 5.

Referring to FIGS. 1-3, the expandable top nozzle subassembly 12 of the present invention has a construction which permits improved utilization of space for accommodating greater growth of fuel rods 18 of the fuel assembly 10 and higher fuel rod burnup. At the same time, the top nozzle subassembly 12 continues to allow the use of a conventional handling system for installing and removing the fuel assembly 10 in and from the reactor core. The expandable top nozzle subassembly 12 basically includes an upper structure 24, a lower adapter plate 26 and a plurality of resiliently-yieldable biasing devices 28.

As shown alone and in greater detail in FIGS. 4-7, the upper structure 24 of the top nozzle subassembly 12 is composed of a top plate 30 and a sidewall enclosure 32 rigidly connected to and depending from the outer peripheral edge 30A of the top plate 30. The top plate 30 has an annular configuration defining a large central opening 34. Two diagonal ones of a plurality of corner portions 30B of the top plate 30 each has a hole 36 defined therethrough which permit insertion of components of the fuel assembly handling system (not shown) for engaging the lower surface 30C of the top plate 30 in order to lift the fuel assembly 10 in installing and removing it from the core. One of the other corner portions 30B has a hole 38 which provides a reference for properly orientating the fuel assembly 10 in the core. Also, a pair of holes 40 is defined through each corner portion 30B of the top plate 30 with each hole 40 surrounded on the lower surface 30C of the top plate by an annular recess 40A formed in the lower surface of the top plate.

The sidewall enclosure 32 of the upper structure 24 is composed of four generally planar vertical wall portions 42 rigidly interconnected together at their opposite vertical edges to define the enclosure 32 in a generally square box-like configuration. At the lower peripheral edge of the sidewall enclosure 32, each wall portion 42 has a narrow inwardly-projecting retaining structure 44 composed of a series of spaced fingers 44A defining the retaining structure in a generally scalloped or serrated configuration.

Figures 8, 9, 10:
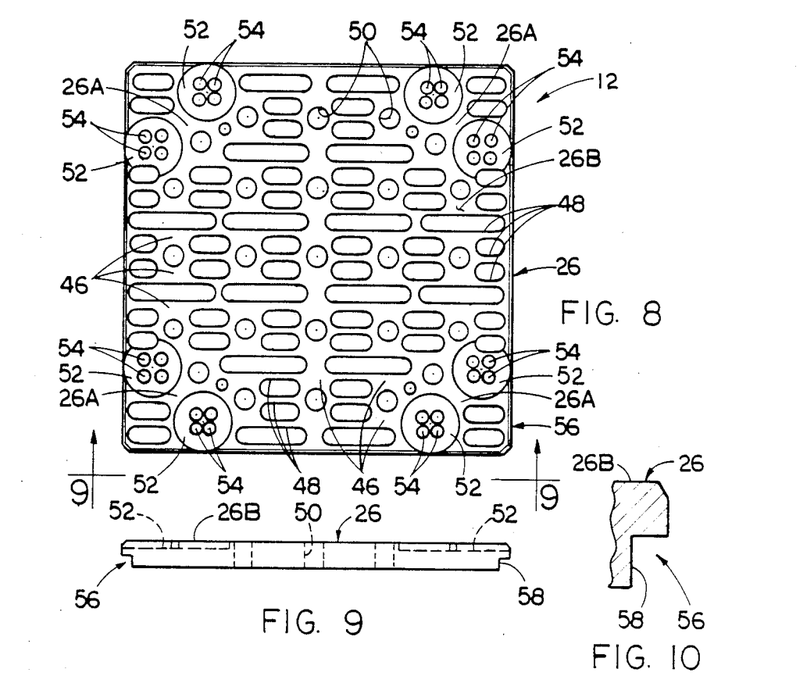
FIG. 8 is a top plan view of the lower adapter plate of the expandable top nozzle subassembly of the present invention.
FIG. 9 is a side elevational view of the lower adapter plate as seen along line 9—9 of FIG. 8.
FIG. 10 is an enlarged sectional view of the right edge portion of the lower adapter plate of FIG. 9.

As shown alone and in greater detail in FIGS. 8-10, the lower adapter plate 26 of the top nozzle subassembly 12 is of generally square configuration and flat construction. The adapter plate 26 is formed of a plurality of cross-laced ligaments or bars 46 defining a plurality of coolant flow openings 48 of oblong shapes. Also, a plurality of circular through holes 50 corresponding in number and pattern to that of the guide thimbles 16 are provided through the adapter plate 26. The through holes 50 are of sufficient dimensional size to permit the adapter plate 26 to be installed over the upper ends of the guide thimbles 16. Further, a pair of circular recesses 52 are defined at each corner portion 26A of the lower adapter plate 26 in the upper surface 26B of the adapter plate. The pairs of recesses 52 are aligned below the pairs of holes 40 and annular recesses 40A in the top plate 24. In each recess 52, a series of coolant flow openings 54 in a generally square pattern are defined through the adapter plate 26. The outer peripheral edge of the adapter plate 26 is undercut to define a ledge or seat structure 56 overlying a continuous recess or groove 58.

Figure 11:
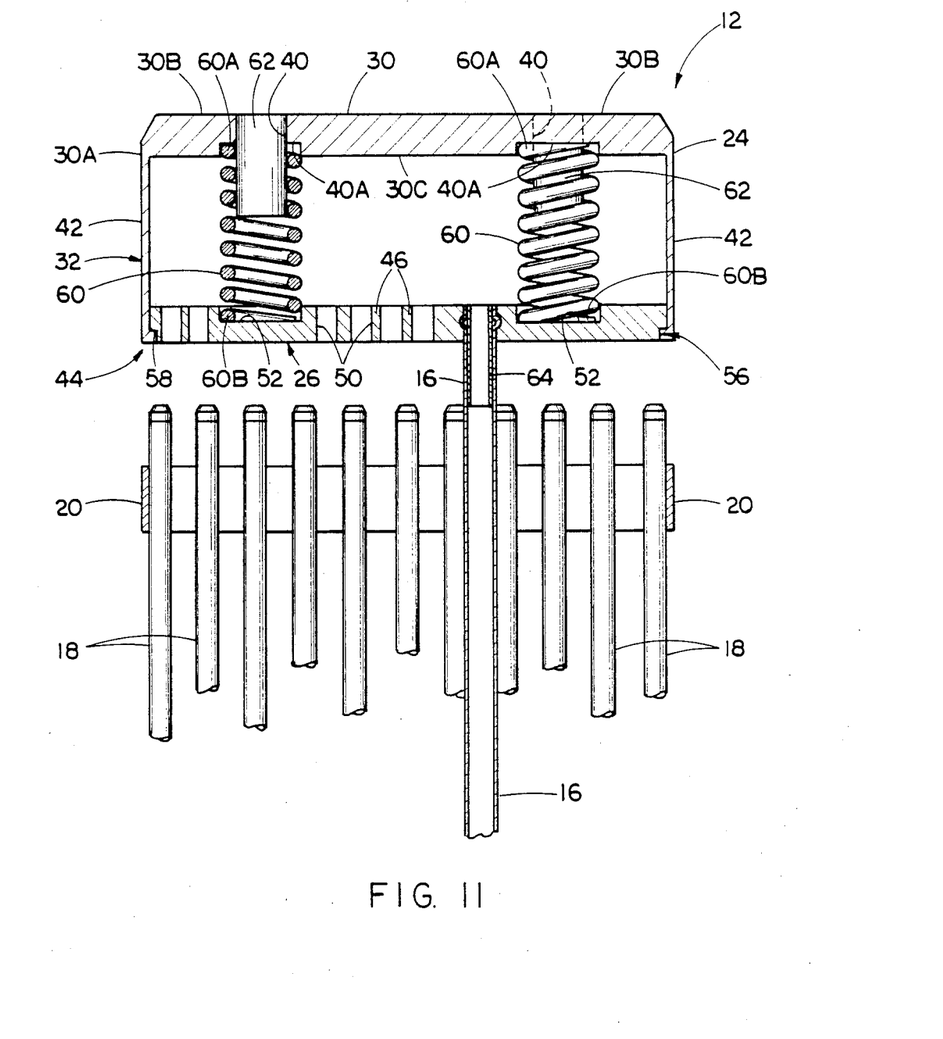
FIG. 11 is a fragmentary sectional view of the fuel assembly as taken along line 11—11 of FIG. 2, illustrating the top nozzle subassembly in an expanded condition.
Figure 12:
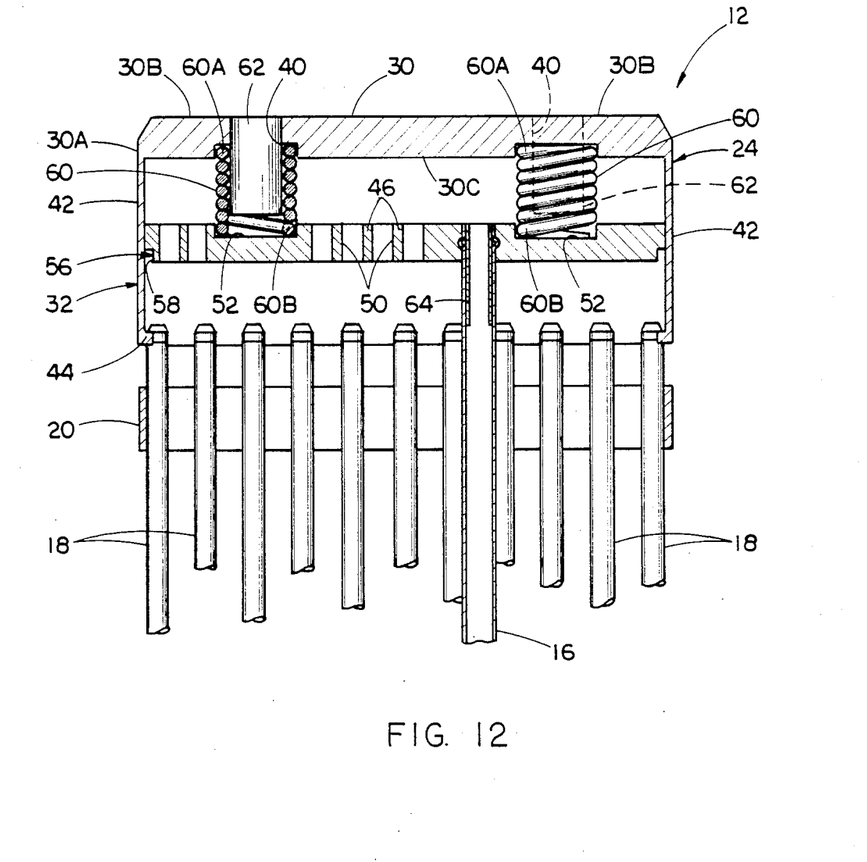
FIG. 12 is a fragmentary sectional view of the fuel assembly similar to that of FIG. 11, but illustrating the top nozzle subassembly in a compressed condition.

Referring to FIGS. 2, 3, 11 and 12, the resiliently-yieldable biasing devices 28 take the form of pairs of coil springs 60 being seated at their opposite upper and lower ends 60A, 60B in the respective recesses 44A, 52 formed at aligned corner portions of the 30A, 26A of the top plate 30 and lower adapter plate 26 located outside of an outer perimeter of the guide thimbles 16. The outer perimeter of the guide thimbles 16 is also aligned below an inner peripheral edge 30C defining the central opening 34 of the top plate 30. Also, a stabilizing or guide member 62 in the form of a short cylindrical plug or bar is secured to the top plate 30 in each of the holes 40 and extends within the corresponding coil spring 60. The guide members 62 provide lateral stabilization of the springs 60 and direct their expansion and compression along a generally vertical path. In the expanded states of the springs 60 seen in FIG. 11 the length of the guide members 62 is less than half the length of the springs. In the compressed state of the springs 60 as seen in FIG. 12, the lower ends of the guide members 62 are located adjacent to the adapter plate 26.

FIG. 11 shows the top nozzle subassembly 12 in an expanded condition, whereas FIG. 12 shows it in a compressed condition. In both conditions of the top nozzle subassembly 12, the adapter plate 26 is stationarily secured in the same position on the upper ends of the guide thimbles 16 in a conventional manner by locking tubes 64. By way of example, the adapter plate 26 is disposed approximately 1 inch to 1.5 inches higher above the upper ends of the fuel rods 18 than is a conventional adapter plate heretofore. Also, the adapter plate 26 is slidably movably mounted within the interior of the sidewall enclosure 32. The sidewall enclosure 32 and adapter plate 26 are not rigidly connected to one another but instead are slidably movable relative to one another. The retaining structure 44 of the sidewall enclosure 32 and the seat structure 56 of the adapter plate 26 provide interengagable means on the lower edge of the enclosure 32 and on a peripheral edge of the adapter plate 26 for capturing and retaining the adapter plate 26 within the enclosure 32 upon movement of the enclosure relative to the adapter plate which, in turn, moves the top plate 30 away from the adapter plate 26. With such arrangement, the adapter plate 26 cannot become separated from the upper structure 24.

To place the top nozzle subassembly 12 in the expanded condition seen in FIG. 11, the upper core support plate (not shown) is removed from imposing a downward bearing contact force upon the top plate 30 of the upper structure 24 of the top nozzle subassembly. The springs 60 are thus allowed to assume their expanded states in which they force the upper structure 24 away from adapter plate 26 and thus force the latter in resting or abutting relation at its annular seat structure 56 upon the fingers 44A of the retaining structure 44 on the enclosure 32 of the upper structure 24. The fingers 44A capture and retain the adapter plate 26 within the enclosure 32. The adapter plate 26 and top plate 30 are now spaced their maximum distance apart and provide sufficient space between them for insertion of the components of the fuel assembly handling system through the corner holes 36 in the top plate.

To place the top nozzle subassembly 12 in the compressed condition seen in FIG. 12, the upper core support plate is installed upon the top plate 30 of the upper structure 24 of the top nozzle subassembly so as to reimpose the downward bearing contact force thereon. The top plate 30 is thus moved downward toward the lower adapter plate 26 forcing the springs 60 to their compressed states and slidably moving the sidewall enclosure 32 downwardly along and relative to the adapter plate 26 and lowering the retaining structure 44 on the enclosure away from the seat structure 56 on the adapter plate 26. The space between the top plate 30 and the adapter plate 26 is now reduced below that needed for insertion of the components of the fuel assembly handling system. However, this does not matter since the fuel assembly is never handled by the system while it is in the core with the upper core support plate placed on the top nozzle subassembly. Thus, the extra or "dead" space previously existing between the top plate 30 and adapter plate 26 has now been eliminated and is instead now being utilized by the higher mounting position of the adapter plate 26 on the guide thimbles 16 permitting greater distance between the adapter plate 26 and upper ends of the fuel rods 18 for increased growth and greater burnup of the fuel rods in the core. Later when the fuel assembly 10 is to be handled, the upper core plate is removed and the springs 60 moves the upper structure 24 upward to its position in FIG. 11 returning the top plate 30 and adapter plate 26 to their maximum spacing for providing the necessary space therebetween for the fuel assembly handling system components.

The scalloped shape of the retaining structure 44 permits them to move downwardly past the upper ends of the fuel rods 18 to the position seen in FIG. 12. The central opening 34 of the top plate 30 accommodates passage of control rods (not shown) into the guide thimbles 16 in a conventional manner. The coil springs 60 transmit the necessary hold-down force from the upper core plate directly to the adapter plate 26. The number and arrangement of the coil springs 60 have the advantage of allowing the load from the upper core plate to be distributed much more evenly to the adapter plate, then in the case of prior hold-down arrangements, thus helping to prevent bow in the fuel assembly. It will be noted also that the sidewall enclosure 32 of the upper structure 24 completely encloses the springs 60 in both expanded and compressed conditions of the top nozzle subassembly 12, thus protecting and shielding the springs from imposition of lateral forces thereon by coolant flow. It should be realized, however, that other forms of biasing devices can be used, such as elongated leaf springs.

In comparison of FIGS. 11 and 12, it can be understood that only the springs 60 extend between and engage both the top plate 30 and the lower adapter plate 26 and that the amount of reduction in the height of the top nozzle subassembly 12 in moving from its expanded to compressed condition is only limited by the amount of displacement the springs 60 can undergo in moving from their expanded to compressed states.

It is thought that the expandable top nozzle subassembly of the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. An expandable top nozzle subassembly for a nuclear fuel assembly, said top nozzle subassembly comprising:
    (a) an upper structure including a top plate and a sidewall enclosure rigidly connected to and depending below an outer peripheral edge of said top plate;
    (b) a lower adapter plate disposed below said top plate of said upper structure and within said sidewall enclosure thereof, said adapter plate and sidewall enclosure being slidably movable relative to one another so as to vertically move said sidewall enclosure past an outer peripheral edge of said adapter plate as said top plate moves toward and away from said adapter plate;
    (c) interengagable means on a lower edge of said sidewall enclosure and on said outer peripheral edge of said adapter plate for capturing and retaining said adapter plate within said sidewall enclosure upon movement of said sidewall enclosure relative to said adapter plate and therewith said top plate which is attached to said sidewall enclosure away from said adapter plate; and
    (d) a plurality of resiliently-yieldable biasing devices disposed in said sidewall enclosure and extending between and engaging said top plate and said adapter plate, said devices being movably displaceable between compressed and expanded states in response respectively to application and removal of a hold-down force on said upper structure in the direction of said adapter plate for permitting and causing movement of said sidewall enclosure relative to and past said outer peripheral edge of said adapter plate so as to move said top plate toward and away from said adapter plate and thereby said top nozzle subassembly between compressed and expanded conditions, only said biasing devices extending between and engaging both said top plate and said adapter plate such that the amount of reduction in the height of said top nozzle subassembly in moving from its expanded to compressed condition is only limited by the amount of displacement said biasing devices can undergo in moving from their expanded to compressed states.

2. The top nozzle subassembly as recited in claim 1, wherein said top plate has an inner peripheral edge defining a large central opening.

3. The top nozzle subassembly as recited in claim 1, wherein said top plate has a plurality of corner portions and at least one recess formed in a lower surface of said top plate at each of said corner portions and facing toward said adapter plate.

4. The top nozzle subassembly as recited in claim 3, wherein said adapter plate has a plurality of corner portions and at least one recess formed in an upper surface of said adapter plate at each of said corner portions and facing toward said top plate, each recess of said adapter plate being aligned below one of said recesses of said top plate.

5. The top nozzle subassembly as recited in claim 4, wherein said adapter plate has a series of flow openings defined therethrough within each of said recesses in said adapter plate.

6. The top nozzle subassembly as recited in claim 4, wherein said biasing devices are a plurality of coil springs each disposed between said top plate and adapter plate and being seated at its opposite upper and lower ends in respectively aligned pairs of said recesses of said top plate and adapter plate and movable between expanded and compressed states.

7. The top nozzle subassembly as recited in claim 6, wherein:
    said top plate has a hole defined therethrough within each of said recesses in said top plate; and
    said subassembly further comprises a guide member secured to said top plate in each of said holes and extending within each of said coil springs for guiding movement of said spring between its expanded and compressed states along a linear path, said guide member being of a predetermined length such that said guide members are located in spaced relation remote from said adapter plate when said biasing devices are in said expanded states and are located adjacent to said adapter plate when said biasing devices are in said compressed states.

8. The top nozzle subassembly as recited in claim 1, wherein said sidewall enclosure of said upper structure is composed of generally planar vertical wall portions rigidly interconnected together at their opposite vertical edges.

9. The top nozzle subassembly as recited in claim 1, wherein said interengagable means on said lower edge of said sidewall enclosure of said upper structure is a retaining structure which projects inwardly from said sidewall enclosure.

10. The top nozzle subassembly as recited in claim 9, wherein said retaining structure is composed of a series of spaced fingers.

11. The top nozzle subassembly as recited in claim 9, wherein said interengagable means on said outer peripheral edge of said adapter plate is an undercut seat structure having a cross-sectional configuration which interfits in overlying relation with the cross-sectional configuration of said inwardly-projecting retaining structure of said sidewall enclosure.

12. In a nuclear fuel assembly including a bottom nozzle, a plurality of guide thimbles having upper and lower ends and being attached at said lower ends to said bottom nozzle and extending upwardly therefrom, an array of upstanding fuel rods extending along and spaced from said guide thimbles and spaced at their lower ends above said bottom nozzle, and a plurality of support grids axially spaced along and connected to said guide thimbles for supporting said array of upstanding fuel rods, an expandable top nozzle subassembly which permits increased fuel rod growth and burnup, said top nozzle subassembly comprising:

(a) an upper structure including a top plate and a sidewall enclosure rigidly connected to and depending below an outer peripheral edge of said top plate;

(b) a lower adapter plate disposed below said top plate of said upper structure and within said sidewall enclosure thereof, said adapter plate and sidewall enclosure being slidably movable relative to one another so as to vertically move said sidewall enclosure past an outer peripheral edge of said adapter plate as said top plate moves toward and away from said adapter plate, said lower adapter plate being stationarily secured to said upper ends of said guide thimbles in spaced relation above upper ends of said fuel rods;

(c) interengagable means on a lower edge of said sidewall enclosure and on said outer peripheral edge of said adapter plate for capturing and retaining said adapter plate within said sidewall enclosure upon movement of said sidewall enclosure relative to said adapter plate and therewith said top plate which is attached to said sidewall enclosure away from said adapter plate; and (d) a plurality of resiliently-yieldable biasing devices disposed in said sidewall enclosure and extending between and engaging said top plate and said adapter plate, said devices being movably displaceable between compressed and expanded states in response respectively to application and removal of a hold-down force on said upper structure in the direction of said adapter plate for permitting and causing movement of said sidewall enclosure relative to and past said outer peripheral edge of said adapter plate so as to move said top plate toward and away from said adapter plate and thereby said top nozzle subassembly between compressed and expanded conditions, only said biasing devices extending between and engaging both said top plate and said adapter plate such that the amount of reduction in the height of said top nozzle subassembly in moving from its expanded to compressed condition is only limited by the amount of displacement said biasing devices can undergo in moving from their expanded to compressed states.

13. The top nozzle subassembly as recited in claim 12, wherein said top plate has an inner peripheral edge defining a large central opening and aligned above said outer perimeter of said guide thimbles.

14. The top nozzle subassembly as recited in claim 12, wherein said top plate at each of said corner portions thereof has at least one recess formed in a lower surface of said top plate and facing toward said adapter plate.

15. The top nozzle subassembly as recited in claim 14, wherein said adapter plate at each of said corner portions thereof has at least one recess formed in an upper surface of said adapter plate and facing toward said top plate, each recess of said adapter plate being aligned below one of said recesses of said top plate.

16. The top nozzle subassembly as recited in claim 15, wherein said adapter plate has a series of flow openings defined therethrough within each of said recesses in said adapter plate.

17. The top nozzle subassembly as recited in claim 15, wherein said biasing devices are a plurality of coil springs each disposed between said top plate and adapter plate and being seated at its opposite upper and lower ends in respectively aligned pairs of said recesses of said top plate and adapter plate and movable between expanded and compressed states.

18. The top nozzle subassembly as recited in claim 17, wherein:
said top plate has a hole defined therethrough within each of said recesses in said top plate; and
said subassembly further comprises a guide member secured to said top plate in each of said holes and extending within each of said coil springs for guiding movement of said spring between its expanded and compressed states along a linear path, said guide member being of a predetermined length such that said guide members are located in spaced relation remote from said adapter plate when said biasing devices are in said expanded states and are located adjacent to said adapter plate when said biasing devices are in said compressed states.

19. The top nozzle subassembly as recited in claim 12, wherein said sidewall enclosure of said upper structure is composed of generally planar vertical wall portions rigidly interconnected together at their opposite vertical edges.

20. The top nozzle subassembly as recited in claim 12, wherein said interengagable means on said lower edge of said sidewall enclosure of said upper structure is a retaining structure which projects inwardly from said sidewall enclosure.

21. The top nozzle subassembly as recited in claim 20, wherein said retaining structure is composed of a series of spaced fingers.

22. The top nozzle subassembly as recited in claim 20, wherein said interengagable means on said outer peripheral edge of said adapter plate is an undercut seat structure having a cross-sectional configuration which interfits in overlying relation with the cross-sectional configuration of said inwardly-projecting retaining structure of said sidewall enclosure.

* * * * *